June 19, 1934.    R. T. HAZELTON ET AL    1,963,364
FRICTION CLUTCH
Filed Oct. 2, 1929    6 Sheets-Sheet 1

INVENTORS
Robert T. Hazelton
Bernard H. Mersch
BY Allen & Allen
ATTORNEYS

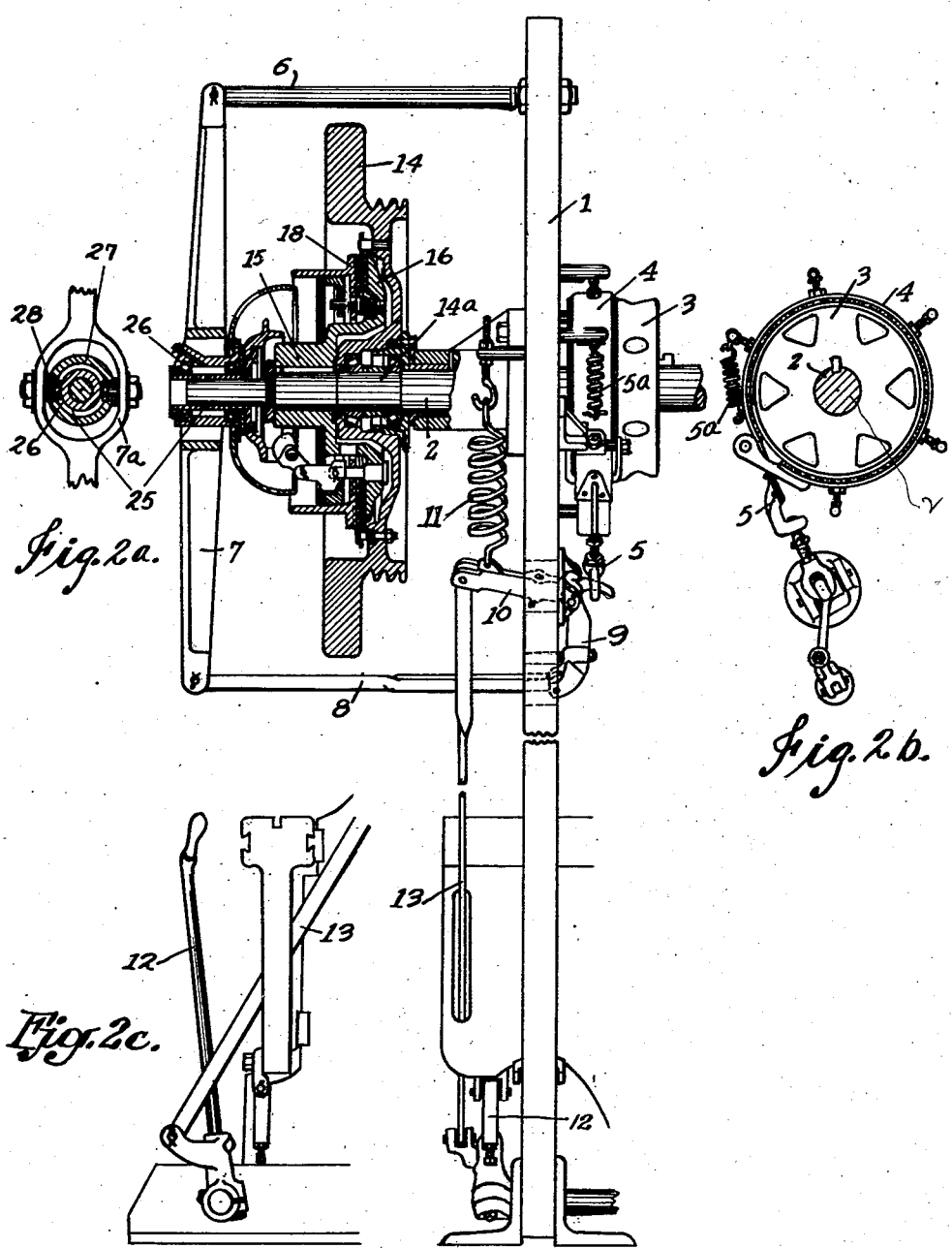

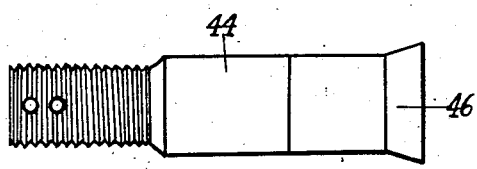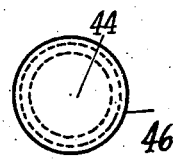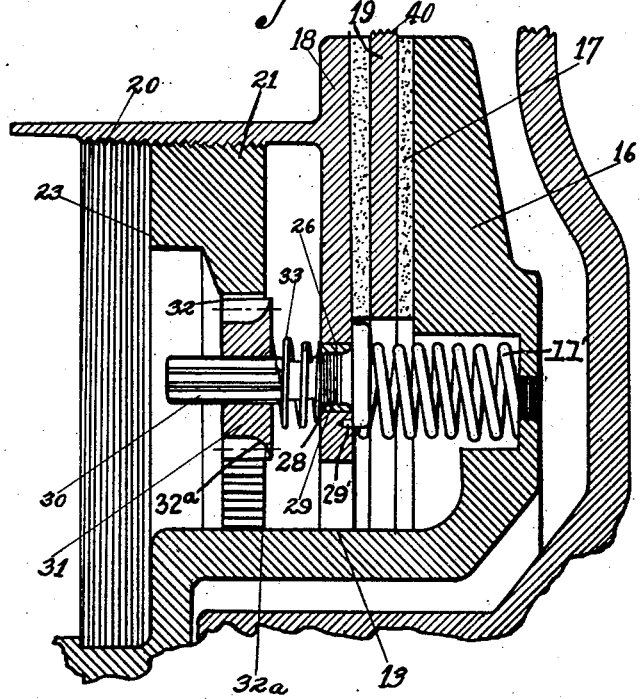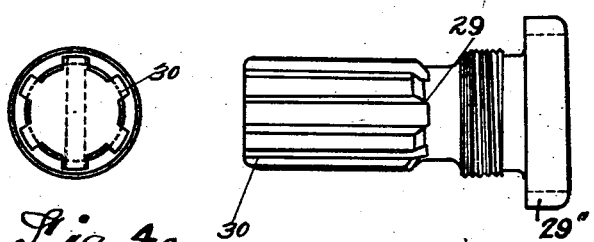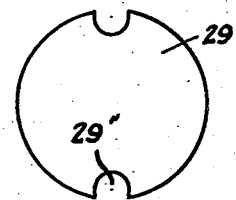

June 19, 1934.　　R. T. HAZELTON ET AL　　1,963,364
FRICTION CLUTCH
Filed Oct. 2, 1929　　6 Sheets-Sheet 4
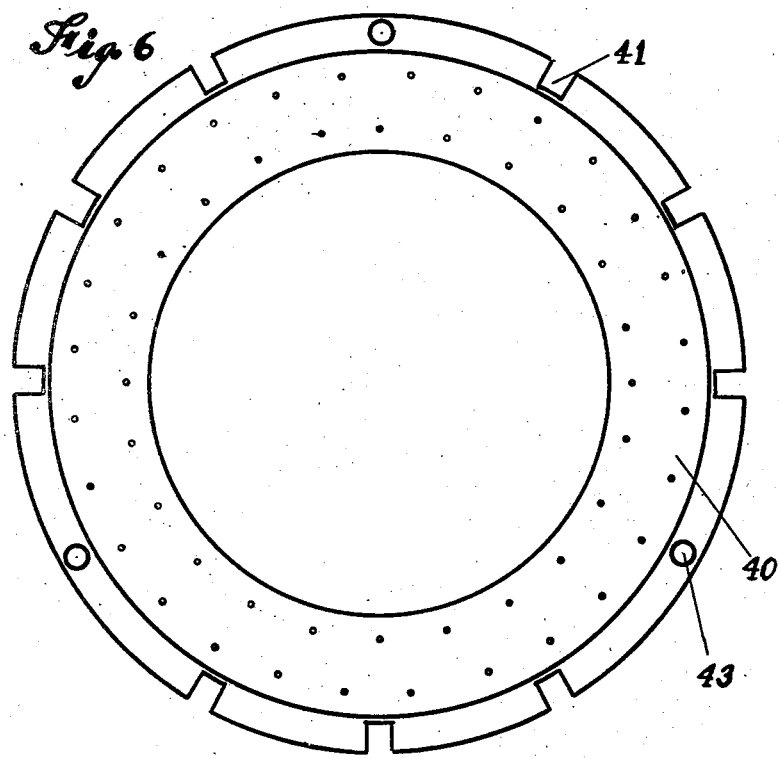
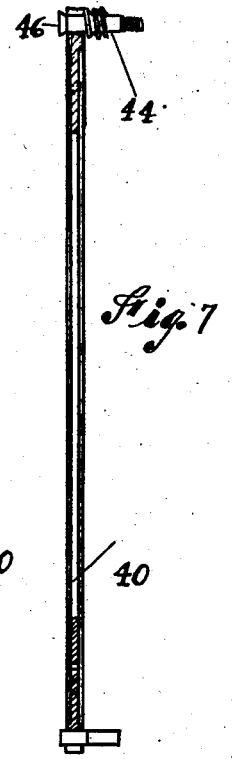
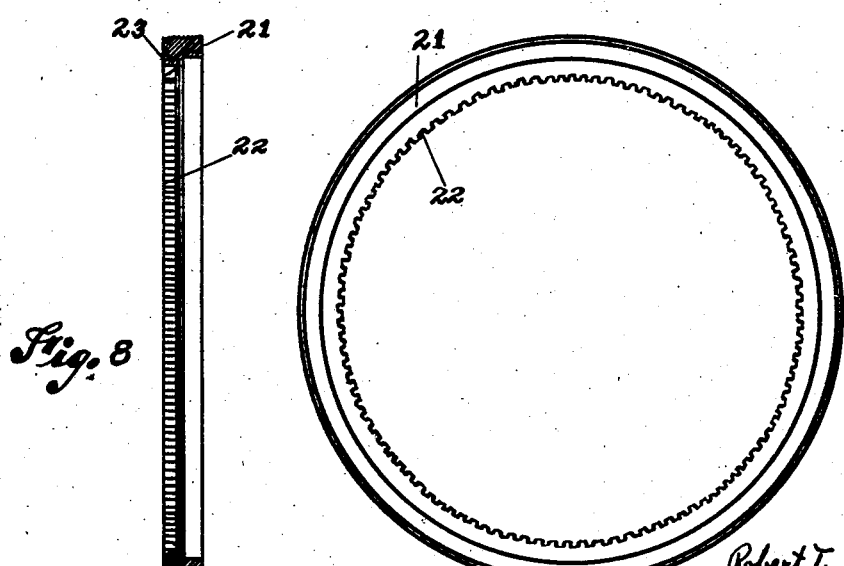
INVENTORS
Robert T. Hazelton
Bernard H. Muroch
BY Allen & Allen
ATTORNEYS June 19, 1934.  R. T. HAZELTON ET AL  1,963,364
FRICTION CLUTCH
Filed Oct. 2, 1929  6 Sheets-Sheet 5
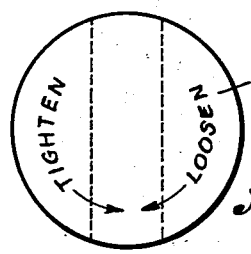
Fig. 10a.
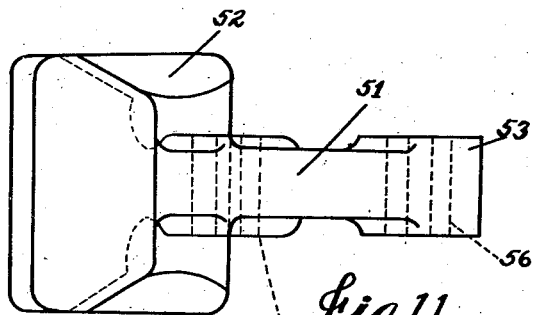
Fig. 11.
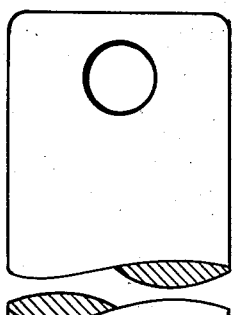
Fig. 10.
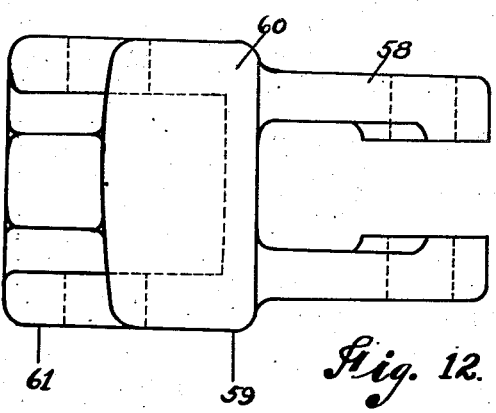
Fig. 12.
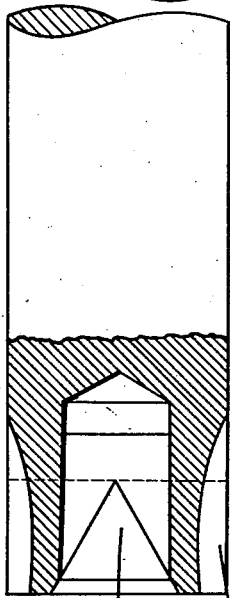
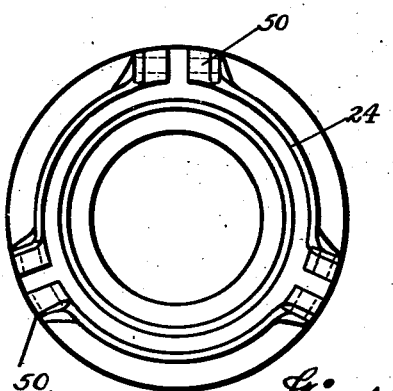
Fig. 13.
Fig. 14.
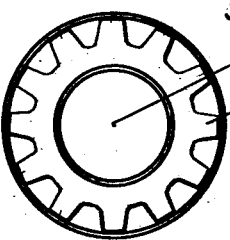
Fig. 10b.
INVENTORS
Robert T. Hazelton
Bernard H. Mersch
BY
Allen & Allen
ATTORNEYS

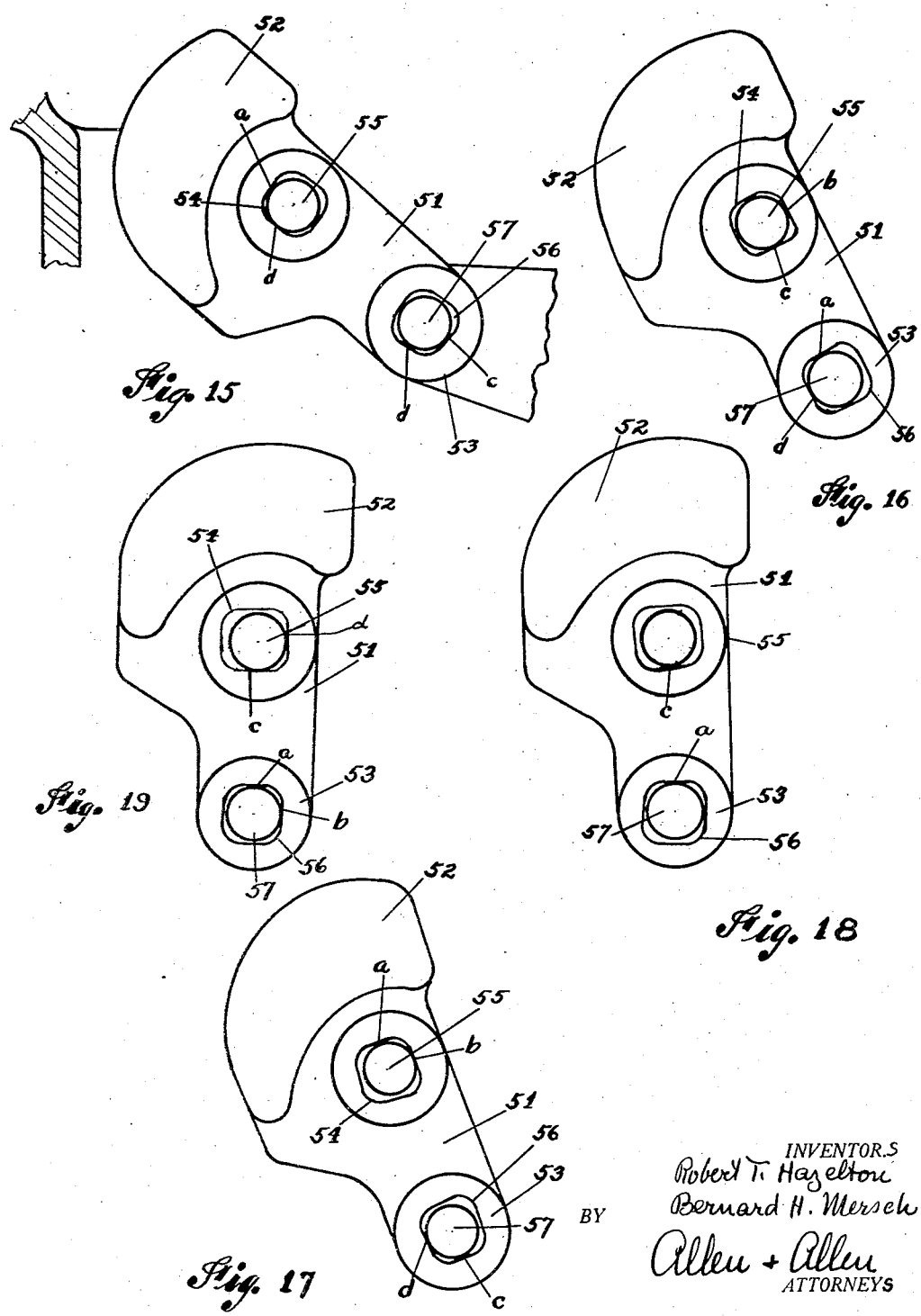

Patented June 19, 1934

1,963,364

UNITED STATES PATENT OFFICE 1,963,364

FRICTION CLUTCH

Robert T. Hazelton, Cincinnati, Ohio, and Bernard H. Mersch, Covington, Ky., assignors to The Cincinnati Shaper Company, Cincinnati, Ohio, a corporation of Ohio Application October 2, 1929, Serial No. 396,776

15 Claims. (Cl. 192—99)

Our invention relates to improvements in connection with friction clutches particularly where same are employed in very heavy duty as in the operation of press brakes.

One of the objects of our invention is to provide a particular form of linkage construction whereby the frictional pressure of the clutch is released for full freedom of motion at the points of linkage without sacrifice of contact. We accomplish this by so forming the pivot pins at the holes in which they engage that the pins at all times contact with a flat surface in the holes and can roll from one contact to another.

Finally we have arranged for counter weights in connection with the linkage construction whereby the clutch is applied and released, which will result in a tendency for the clutch to release once its motion is begun, due to shifting of the counter weights in such a way as to take advantage of centrifugal force instead of having to overcome centrifugal force which is a common difficulty in connection with heavy duty friction clutches.

It may be noted that one of the very great advantages of our improved construction lies in the fact that the clutch device can be opened by a spring of fairly low power thus making it possible to provide a foot or hand lever operation for the clutch which does not have a powerful spring working against it.

We accomplish our objects by that certain construction and arrangement of parts of which a typical instance will be fully illustrated and described and the novelty of which will be set forth in the appended claims.

In the drawings:

Figure 2 is a side elevation partly in section of the complete clutch and brake mechanism for use on a press brake on a smaller scale than Figure 1 and showing the same parts that appear in Figure 1 in the open position of the clutch.

Figure 2a is a detail of the rocker arm engagement.

Figure 2b is a detail elevation of the brake mechanism used with the clutch.

Figure 2c is a side elevation corresponding to the lower part of Figure 2.

Figure 3 is an enlarged sectional detail of the locking device for the friction adjusting nut.

Figure 4 is a side elevation of the locking stud employed in the construction shown in Figure 3 and Figures 4a and 4b are elevations respectively of the two ends of the locking stud shown in Figure 4.

Figure 5 is a detail side elevation, and Figure 5a a detail end elevation of one of the silencer bolts.

Figure 6 is a front elevation of the main friction ring.

Figure 7 is a section taken vertically through the ring shown in Figure 6.

Figure 8 is a section taken centrally of the clutch adjusting nut.

Figure 9 is a front elevation of said nut.

Figure 10 is an elevation partly in section of the operating tool for adjusting the friction nut and Figures 10a and 10b are elevations of the two ends thereof.

Figure 11 is a top plan view of one of the links.

Figure 12 is a bottom plan view of one of the links.

Figure 13 is a central vertical section on substantially the same scale as Figure 1 of the link carrying ring.

Figure 14 is a rear elevation of the said ring.

Figure 1:
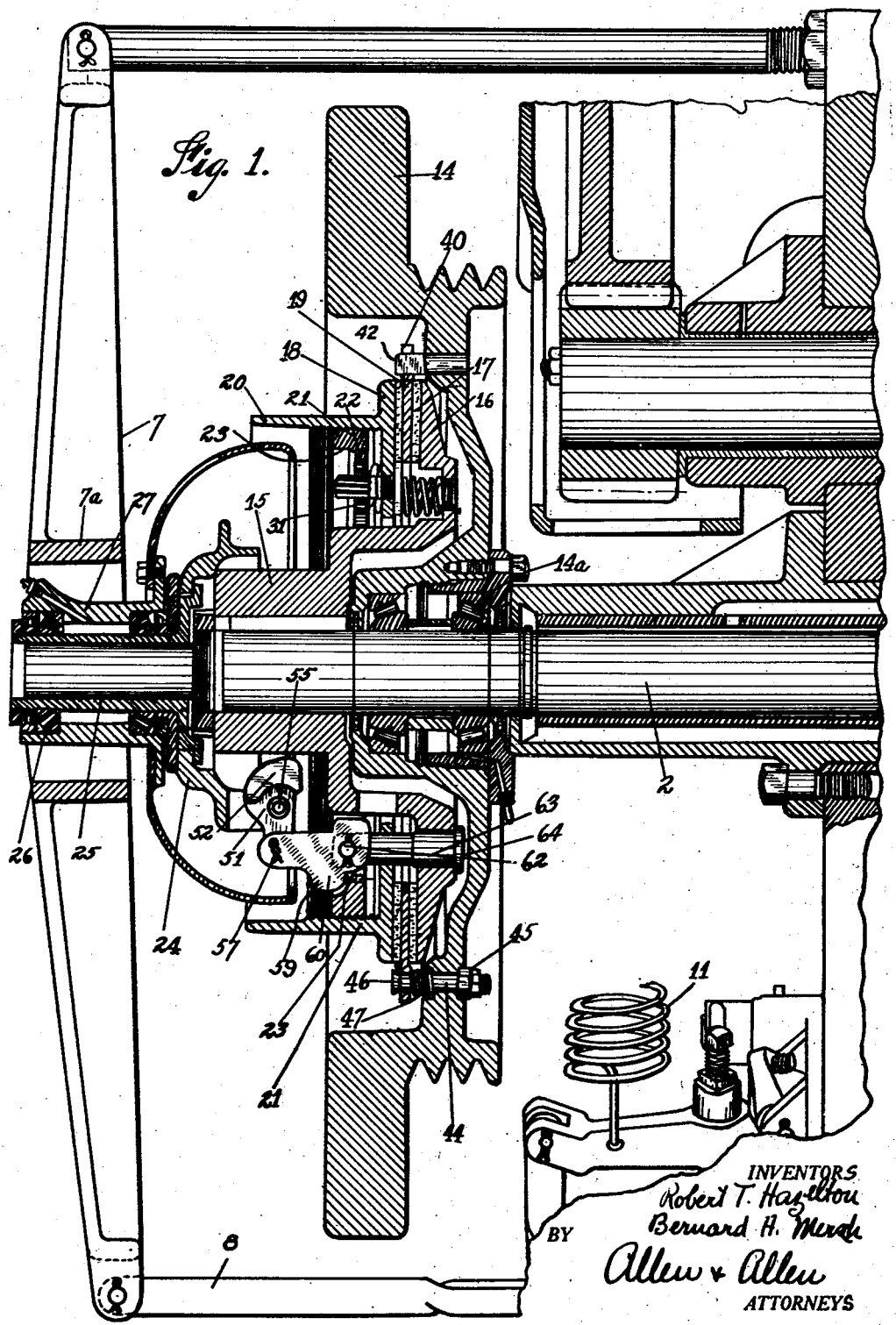
Figure 1 is a detail central vertical section taken through the clutch mechanism showing the clutch in engaging position.

Figures 15, 16, 19, 18 and 17 are side elevations illustrating the following positions of the linkage devices respectively:—With the clutch in "off" position; with the clutch moving toward on position; with the clutch in fully engaged position; with the clutch in engagement so far as the friction devices are concerned but in which the operating devices have started to move; and with the clutch in still further disengaged position.

Referring first to Figure 2, we have indicated at 1 the frame of a press brake, and at 2 the shaft which operates the brake. On this shaft is a brake drum 3, about which is the brake band 4. The adjustable arm 5 serves to apply the brake band. It will be noted that any type of mechanism deriving power from the shaft 2 could be employed and we have indicated no particular mechanism since our invention resides in the clutch mechanism.

On a rod 6 is pivotally supported the rocker arm 7 which is used to operate the clutch mechanism. This arm is connected at its lower end to a link 8, which link is operated by means of a lever 9 to which it is connected. The lever 9 is itself pivoted to a rocker arm 10, supported in the frame, the arrangement being such that when the arm 10 is pulled down at the end opposite to its connection with the lever 9, the link 8 will be pulled inwardly thus pulling in the lower end of the rocker arm 7, and as will be noted applying friction to the clutch mechanism.

At the same time that friction is applied to the clutch, the arm 5 which operates the brake drum mechanism is permitted to rise, so that the spring 5a which applies the brake is extended and the brake band 4 is released.

When the rocker arm 10 is permitted to rise under the influence of the spring 11, which is itself secured to the arm and to the frame, the clutch is released, and the brake applied by a reversal of the movements last above described. Springs 11', in the clutch, also aid in release of the clutch.

For the purpose of depressing the free end of the rocker arm 10, we may employ any desired mechanism. Illustrated in the drawings is a hand lever 12, which is coupled to a rod 13, the rod being pivotally connected to the end of the rocker arm.

Referring to Figure 1 for a larger scale showing, it will be noted that we have provided a drive wheel 14 which is supported on the shaft 2 by means of a roller bearing 14a. Also mounted on the shaft but in this instance keyed thereto is a collar 15, having the flange 16 which serves as the main clutch plate or driver against which the outer friction disk 17 is mounted. Mounted to slide axially on the studs 63 of the collar 15 is the friction ring 18 against which the other friction disk 19 is mounted, said ring having an internally threaded annular flange 20.

Within the said flange 20 is mounted the adjusting ring 21, which acts as an internal nut in the flange, and is cut on its inner periphery with teeth 22, whereby its position within the flange is adjusted. The ring 21 is heavier at its outer periphery and is formed with an annular shoulder 23, against which the operating linkage devices bear. Accordingly the position of the ring 21 determines the position of the friction ring 18 with relation to said devices, which as will be noted, controls the grip of the clutch.

The linkage device mounting and operating collar 24 is arranged on a slidable sleeve 25 on the outer end of the shaft 2. On this sleeve is a roller bearing 26, which supports a collar 27. The large rocker arm 7 has its intermediate portion 7a expanded to straddle the collar 27, and pins 28 in the portion 7a engage the collar. The arrangement is such that when the rocker arm is moved in one direction (inwardly), the mounting collar is moved inwardly, thus rocking the linkage devices and applying the clutch. When the movement of the rocker arm 7 is in the opposite direction, the linkage devices are swung or are free to swing oppositely to the movement which applies pressure, and the clutch is released.

The general arrangement of the clutch as so far described is the preferred arrangement to which we apply our several improvements and we will now proceed to describe the improvements and their relation to the structure for applying and releasing the clutch.

The self-locking adjustment

Referring to Figures 3 to 5, and Figures 8 and 9, it will be noted that in the friction ring 18 is a threaded hole 28 into which is screwed the mounting stud 29. The outer end of this stud is cut with lengthwise teeth or splines 30, and slidable on this portion of the stud is a pinion 31, toothed internally to engage the spline teeth and toothed externally to engage the teeth 22 of the adjusting ring 21. The bases of the teeth 32 of the pinion are tapered at the back as indicated at 32a, which prevents the pinion from sliding any further outwardly than a position of mesh with the teeth 22. The pinion is free to slide inwardly, however, to clear the teeth on the ring 21. A spring 33 set over the stud and engaging the friction ring at one end and the pinion at another tends to press the pinion into position of mesh with the teeth of the adjusting ring, hence locking this ring against movement. A pin 29' engages in a notch 29'' in the head of the stud 29 to lock the stud against turning.

A tool illustrated in Figures 10, 10a and 10b, is used to engage and rotate the adjusting ring. This tool has a shank 34, teeth 35 at the inner end, a bore 36 within the toothed portion to engage over the splined locking stud so as to rotate thereon, the inner end of the tool being used for displacing the pinion 31. Thus when the tool is set over the locking stud, and pushed in, it will force the locking pinion out of mesh with the adjusting ring. The toothed portion of the tool will then come into mesh with the teeth of the adjusting ring, and the ring will be free to turn as the tool is revolved. When the tool is released the pinion will move back outwardly under impulse of the spring behind it and will engage in the teeth of the adjusting ring.

If in the adjusting operation the teeth of the ring and of the pinion, when the latter is engaged over the splines of the mounting stud, do not come into mesh, the tool will be reinserted and sufficient movement given to the adjusting ring to result in the pinion coming into place and locking it.

This construction where a ready mounting for a tool is provided and at the same time an automatic locking arrangement comes into play for locking the adjusted part when the tool is removed, is simple to construct, and of easy operation, in addition to providing a very positive locking of the adjusted member.

The non-chattering friction plate

The friction plate 40 which is formed of steel in the construction shown is held in position on the drive wheel 14. To this end the plate has a series of notches 41 in its periphery which engage studs 42 on the driving wheel disk. The plate has also a series of holes 43 therein for mounting bolts. The mounting bolts 44 pass through the drive wheel disk where they are equipped with nuts 45, and they also pass through the holes 43 in the friction plate.

The outer ends of the bolts are formed with tapered heads 46 and the shanks of the bolts have an appreciable clearance in the holes 43.

Arranged over the bolts and lying between the drive wheel and the friction plate are springs 47, which tend to push the friction plate away from the drive wheel disk. This action of the springs brings the tapered heads to the holes in the friction plate, where they come into snug engagement instead of the loose engagement.

It will be apparent that when the clutch is brought together into frictional driving relation, the friction plate will have some slight freedom of movement, both as to the mounting bolts and as to the driving studs 42. When the clutch is freed, however, the friction plate is moved to a position where it engages tightly over the tapered heads of the mounting bolts, whereby it is held without rattling. A rattling of the friction plate member of a clutch of the type being described is a disagreeable feature of it, and by the simple mechanism described, this rattling is avoided, while permitting suitable clearance for the driving studs and the notches in the disk.

*The freely moving linkage arrangement.*

Referring to Figures 13 and 14, for a detailed showing of the linkage operating collar 24, it will be noted that it is provided with a series of trunnions 50, in this case three in number.

In Figures 11 and 15 to 19 are shown in detail the links. There are three of these links used in the structure illustrated, the links having bodies 51, cam shaped weight portions 52, which are free to swing between the trunnions on the mounting ring, and ends 53 which are secured to the levers. There are two holes in each link, the holes 54 for engagement with mounting pins 55 that pass through the trunnions on the mounting ring, and holes 56 which engage the pins 57, which secure the links to the levers. These holes are peculiar in that they are formed on a radius considerably larger than the radius of the pins 55 and 57, and are flattened symetrically with relation to each other so as to form substantially square holes. The object of these squared holes will be dealt with later.

In Figure 12 is shown one of the levers, which are also shown in side elevation in Figures 1 and 2. The levers are formed with bifurcated ends 58 which engage over the ends of the links, and are held to the links by the pins 57 which have a tight fit in the levers, and with body portions 59, which are formed into shoulders 60 to engage in the shoulder 23 of the adjusting ring, to which reference has been made.

The ends of the levers located beyond the shouldered portions are bifurcated as shown at 61, and pins 62 passing through the ends 61, serve to mount pivotally the operating studs 63. These studs have heads 64 which engage the inner face of the main clutch plate and have their outer ends held pivotally to the levers.

Referring now to Figure 2 which shows the clutch in off position and Figure 1 which shows it in on position, when the mounting ring is pushed inwardly of the device, this tends to force the ends of the levers outwardly of the device away from the shaft 2. This forces the levers to rock on the shoulder of the adjusting ring, which results in pulling the operating studs toward the adjusting ring. The result of pulling the studs in the manner noted is to bring the friction ring 18 closer to the flange 16. Since the friction disc 19 that is mounted on the drive wheel 14 is located between the ring 18 and flange 16, the result will be that the shaft 2 is driven from the drive wheel.

The advantage of the square holes for the round pins in the linkage construction is that it imparts a rolling action to the pins within the holes, thus greatly reducing friction at the critical points of the mechanism. This has been illustrated in Figures 15 to 19.

In Figure 19, which shows the full on position of the clutch the pins engage on walls $c$ and $d$ in the upper hole, and $a$ and $b$ of the lower hole in the particular link illustrated. The first impulse toward releasing the clutch will result in a slight movement of the pins within the holes before the levers have been at all operative. This movement will result in the pins rolling away from contact at $d$ and $b$, leaving the contact at $a$ and $c$ only. (Fig. 18).

The rolling movement noted permits the pins to pass center of the holes in the links, the past center position being provided to reduce the thrust on the running engagement bearings when the clutch is held in engagement for continuous operation.

There is practically no resistance to movement of the pivotal connections to the links, and the clutch opening spring can easily snap the clutch open, if no centrifugal force opposes this action.

When the releasing movement of the mounting ring is initiated, the first effect is to cause the upper mounting pin to move to the left in the hole of the link, rolling on surface "$c$", and it may strike the left hand wall of the hole in the link, momentarily; but the instant that the upper pin passes to the left of the center of the lower pin in the lever, the link tends, by reason of the weighted ends, to fall to the left faster than the travel of the mounting is to the left, so that the pins first assuming the position shown in Figure 18 with contact at "$c$" and "$a$" are then found in the position shown in Figure 17, which is with contact at $a$—$b$ for the upper pin, and $c$—$d$ for the lower pin.

The continued movement of the mounting ring to the left under the urge of spring 11, and the overcoming of any centrifugal force by the weighted ends of the toggle links, finds the pins in the position shown in Figure 15, in which the upper pin is in contact at points $a$—$d$, and the lower pin remains in contact as in Figure 17 at $c$—$d$.

Referring finally to the weights on the links, it has been noted that centrifugal force is one powerful element opposing the easy opening of a friction clutch of the type in question here. The levers tend to remain in position to hold the clutch in driving position because of centrifugal force, which acts to keep the outer ends of the levers spread away from the shaft 2, which it will be recalled is the friction applying position of the levers.

In Figure 19 is shown a link in position when the clutch is on. The weight portion of the link is so proportioned that when the slight movement has been accomplished to bring the link to the position in Figure 18, the tendency of the upper end of the link to fly outwardly will overcome the tendency of the lever to fly outwardly.

Furthermore, the further the links are moved toward open position, the more unbalanced becomes the tendency of the link weights, so that centrifugal force acts quite decidedly in a way which assists the opening of the clutch.

We have not attempted to illustrate modified structures in which the several features of our novel clutch will be useful, but it will be understood that we have intentionally described but one way in which our invention herein involved is useful, and that in the expressions employed in the claims that follow we desire that the full range of equivalents be included.

Having thus described our invention, what we claim as new and desire to secure by Letters Patent, is:

1. In a clutch mechanism, the combination with a driving member and a driven member, friction means for setting up driving engagement between them, and linkage devices for setting up the frictional engagement, said devices having a movable member to which they are pivotally mounted, and having intermediate pivotal joints, said pivotal mountings and joints being formed of rounded pins, engaging in holes, said holes being larger than the pins and having flattened walls.

2. In a clutch mechanism, the combination with a driving member and a driven member, friction means for setting up driving engagement between them, and linkage devices for setting up the frictional engagement, said devices having a movable member to which they are pivotally mounted, and having intermediate pivotal joints, said pivotal mountings and joints being formed of rounded pins, engaging in holes, said holes being larger than the pins and having flattened walls, said flattened walls being spaced sufficiently that the pins may engage adjacent walls but not opposite walls.

3. In combination in a friction clutch, frictionally engaging members, and a means for bringing the said members into and out of engagement comprising a linkage device having a pair of pivotally connected parts, operative connections between said pivotally connected parts and the frictionally engaging members, means for moving one part of the linkage device, and the pivotal connection of the said part with said means comprising a rounded pin in one part and a hole in the other for the pin, said hole being larger than the pin and having flattened walls.

4. In combination in a friction clutch, frictionally engaging members, and a means for bringing the said members into and out of engagement comprising a linkage device having a pair of pivotally connected parts, operative connections between said pivotally connected parts and the frictionally engaging members, means for moving one part of the linkage device, and the pivotal connection of the said part with said means comprising a rounded pin in one part and a hole in the other for the pin, said hole being larger than the pin and having flattened walls, said hole having its walls spaced sufficiently that the pin can engage adjacent walls but not opposite walls.

5. In combination in a friction clutch, frictionally engaging members, and a means for bringing the said members into and out of engagement comprising a linkage device having a pair of pivotally connected parts, operative connections between said pivotally connected parts and the frictionally engaging members, means for moving one part of the linkage device, and a pivotal connection of the said part with said means, the pivotal connection for the parts of said linkage device comprising a pin in one part and a hole in the other, said hole being larger than the pin and having flattened walls.

6. In combination in a friction clutch, frictionally engaging members, and a means for bringing the said members into and out of engagement comprising a linkage device having a pair of pivotally connected parts, operative connections between said pivotally connected parts and the frictionally engaging members, means for moving one part of the linkage device, and a pivotal connection of the said part with said means comprising a rounded pin in one part and a hole in the other for the pin, said hole being larger than the pin and having flattened walls, said hole having its walls spaced sufficiently that the pin can engage adjacent walls but not opposite walls.

7. In combination in a friction clutch, frictionally engaging members, and a means for bringing the said members into and out of engagement comprising a linkage device having a pair of pivotally connected parts, operative connections between said pivotally connected parts and the frictionally engaging members, means for moving one part of the linkage device, and a pivotal connection of the said part with said means comprising a rounded pin in one part and a hole in the other for the pin, said hole being larger than the pin and having flattened walls, the means for setting up engagement for the toggle parts with the frictional engaging members comprising an abutment on one of the members against which the linkage device engages, and a stud connected to the linkage device which is secured to the other of the members.

8. In a clutch mechanism, the combination with a driving member and a driven member, friction means for setting up driving engagement between them, and linkage devices for setting up the frictional engagement, said devices having a movable member to which they are pivotally mounted, and having intermediate pivotal joints, said pivotal mounting and joints being formed of rounded pins, engaging in holes, said holes being larger than the pins and having flattened walls, an abutment element on one of the members for engagement by the linkage devices, and means secured to the other member and secured to the linkage devices, whereby movement of one end of the linkage device will rock it against the one member and pull against the other thus bringing them together.

9. In a friction clutch, rotary elements to be connected or disconnected, friction means for setting up driving engagement between said elements, comprising a middle member connected to one element and two members connected to the other element and adapted to be drawn together to grip said middle member between them, devices each including a connected link and lever connected to the respective members, and arranged so that when rocked they will close to draw the two members together in locked position, said links having action on said levers and having weighted portions so disposed that upon opening of the engagement between said members the centrifugal force of the weighted portions will help to open the devices.

10. In a friction clutch, rotary elements to be connected or disconnected, friction means for setting up driving engagement between said elements, comprising a middle member connected to one element and two members connected to the other element and adapted to be drawn together to grip said middle member between them, linkage devices having engaging means for each of the two members and arranged so that when rocked they will draw the two members together, said linkage devices having weighted portions so disposed that upon opening of the engagement between said members the centrifugal force of the weighted portions will act to open the devices, said devices being formed of parts pivotally connected together by means of pins in one part and holes in the other part, said holes being larger than the pins and having flattened walls, the parts so arranged that upon opening of the devices the free movement will be such as to permit the weighted portions of the devices to move past dead center thus tending to open the devices before the take up of the pin and hole bearing has commenced to act positively upon said rotary elements.

11. In a friction clutch, rotary elements to be connected or disconnected, friction means for setting up driving engagement between said elements, comprising a middle member connected to one element and two members connected to the other element and adapted to be drawn together to grip said middle member between them, linkage devices having engaging means for each of the two members and arranged so that when rocked they will draw the two members together, said linkage devices having weighted portions so disposed that upon opening of the engagement between said members the centrifugal force of the weighted portions will act to open the devices, said devices being formed of parts pivotally connected together by means of pins in one part and holes in the other part, said holes being larger than the pins and having flattened walls, the parts so arranged that upon opening of the devices the free movement will be such as to permit the weighted portions of the devices to move past dead center thus tending to open the devices before the take up of the pin and hole bearing has commenced to act positively upon said rotary elements, spring means for opening the devices, and means controlled by the operator directed against the spring means for closing the devices.

12. In a friction clutch, rotary elements to be connected or disconnected, friction means for setting up driving engagement between said elements, comprising a middle member connected to one element and two members connected to the other element and adapted to be drawn together to grip said middle member between them, devices each including a connected link and lever connected to the respective members, and arranged so that when rocked they will close to draw the two members together, said links having action on said levers and having weighted portions so disposed that upon opening of the engagement between said members the centrifugal force of the weighted portions will help to open the devices, spring means for insuring complete opening of the devices and means controlled by the operator directed against the spring means for closing the devices.

13. In combination with the rotary driving and driven elements of a clutch, and members relatively axially movable into and out of clutching engagement and connected to the respective clutch elements, operating means to effect said engagement, comprising a lever fulcrumed on one member and having a short arm and a long arm, said short arm extending outward from the axis of said members into engagement with the other member for causing clutching engagement of the members, and the long arm of the lever extending along said axis away from said members, a link, a pivot connecting said link to said long arm and a pivot connecting said link to said operating means between said long arm and said axis and having a weighted extension between the latter pivot and said axis with its center of gravity substantially in the plane of said pivots, said link being disposed with said plane substantially at right angles to said axis, whereby the reaction on said lever and the centrifugal action on said weighted extension are ineffective to swing said link, for locking the members in their clutching engagement, and whereby, upon movement of said operating means away from said members for the release of the members, said link is swung so that said reaction and said centrifugal action become effective to swing said link and facilitate said release.

14. A combination as set forth in claim 13, in which the engagement of the short arm of the lever with the respective member is ineffective to separate the members, and including a spring effective to separate the members when they are released.

15. A combination as set forth in claim 13, in which the part of the member engaged by the short arm of the lever is adjustable axially of the remainder of said member and in which the engagement of the short arm of the lever with said part is ineffective to separate the members, and including a spring effective to separate the members when they are released.

ROBERT T. HAZELTON.
BERNARD H. MERSCH.